SYSTEM FOR RECORDING AND REPRODUCING PULSE CODE MODULATED DATA

Filed May 10, 1963 3 Sheets-Sheet 1

INVENTOR.
PLEASANT T. COLE

BY [signature]
[signature]
ATTORNEYS

SYSTEM FOR RECORDING AND REPRODUCING PULSE CODE MODULATED DATA

Filed May 10, 1963 3 Sheets-Sheet 2

INVENTOR.
PLEASANT T. COLE

BY [signatures] Earl Levy
ATTORNEYS

SYSTEM FOR RECORDING AND REPRODUCING PULSE CODE MODULATED DATA

Filed May 10, 1963 3 Sheets-Sheet 3

INVENTOR.
PLEASANT T. COLE
BY
ATTORNEYS

United States Patent Office 3,327,298
Patented June 20, 1967

3,327,298

SYSTEM FOR RECORDING AND REPRODUCING PULSE CODE MODULATED DATA

Pleasant T. Cole, Martin Park, Md., assignor to the United States of America as represented by the Administrator of the National Aeronautics and Space Administration Filed May 10, 1963, Ser. No. 279,646
8 Claims. (Cl. 340—174.1)

The invention described herein may be manufactured and used by or for the Government of the United States of America for governmental purposes without the payment of any royalty thereon or therefor.

The present invention relates to a system for recording and reproducing pulse code modulated (PCM) data, and more particularly, to a more efficient system of this type wherein PCM data is reproduced from data stored on magnetic tape and wherein the magnetic tape can achieve improved packing density.

In pulse code modulated (PCM) magnetic tape recording and reproducing (playback) systems the playback head tends to alter the shape of the recorded signal in accordance with the pulse repetition rate of the recorded signal. Accordingly, to derive the recorded signal the reproducing section of the system must reconstruct the recorded signal from the one altered by the playback head.

In the past, the pulse repetition rate of the pulses forming the recorded signal was chosen so that the playback head behaved as a differentiating circuit to the recorded signal. This was done since it was recognized how the differentiated signal obtained from the playback head could be used, in conjunction with known circuitry, to reconstruct the recorded signal. However, while the prior art PCM data recording and reproducing systems using this technique functioned satisfactorily under most conditions, (1) they did not permit the maximum transfer of energy to be maintained from record to playback and (2) they were limited in the packing density that could be achieved on the magnetic tape used therewith. Therefore, these two important requirements were sacrificed.

Accordingly, it is an object of this invention to provide a magnetic tape PCM data recording system which can efficiently reconstruct, from the waveform obtained from the playback head, the recorded signal while being capable, at the same time, of maintaining a maximum transfer of energy from record to playback.

It is another object of this invention to provide a magnetic tape PCM data recording and reproducing system in which the reproducing section thereof can efficiently reconstruct the recorded signal and wherein a large packing density can be achieved on the magnetic tape used therewith.

It is a further object of this invention to provide a reliable, efficient and precision magnetic tape (PCM) data recording and reproducing system which can simply reconstruct the recorded signal while being capable, at the same time, of both (1) maintaining a maximum transfer of energy from record to playback and (2) achieving a large packing density on the magnetic tape used therewith.

It is still another object of this invention to provide a magnetic tape PCM data recording and reproducing system capable of achieving a large packing density on the magnetic tape used therewith so that the system will have utility in situations where weight and space requirements are critical factors.

It is still a further object of this invention to provide a magnetic tape PCM data recording and reproducing system having the characteristic enumerated in the above objects, and, at the same time, being capable of recording and reproducing more than one recording track.

These and other objects are carried out by a system wherein the playback head is designed so that the gap thereof will have a width equal to approximately one-half wavelength of the recorded PCM data at its fundamental pulse repetition frequency (PRF). Constructed in this manner, the playback head behaves as a low pass filter and provides an output signal which is an intergral of the recorded signal. This intergrated signal is at the maximum energy that the playback head is capable of providing and contains all of the recorded information. To reconstruct the recorded PCM data from this integrated signal, the signal is passed by a high pass filter to an amplifier. The amplifier signal is then clipped and shaped by appropriate circuits.

The exact nature of this invention, as well as other objects and advantages thereof, will be readily apparent from consideration of the following specification relating to the annexed drawings in which.

Figures 1, 4, 7:
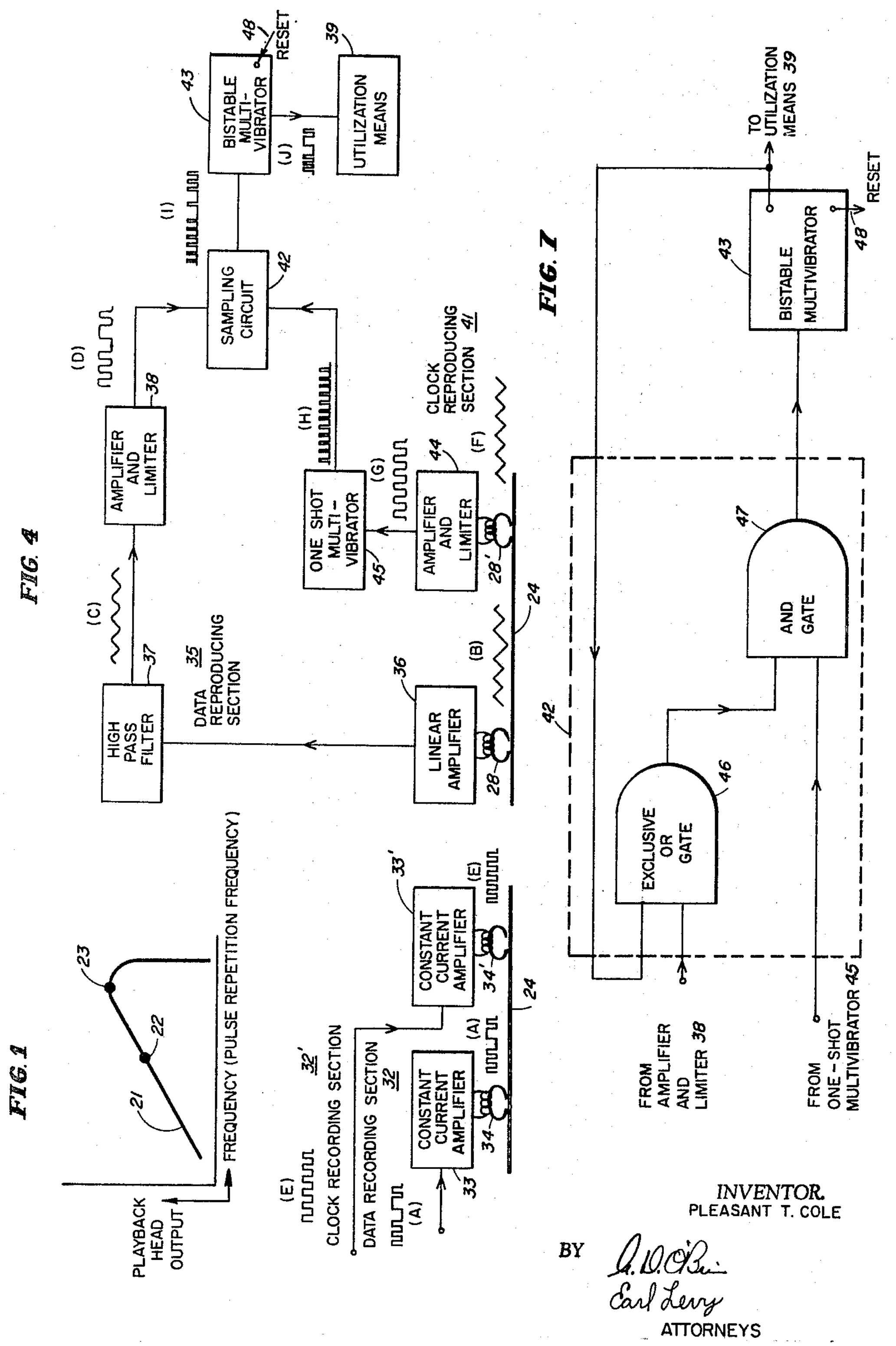
FIGURE 1 is a typical playback head frequency response curve.
FIGURE 4 is a block diagram showing the recording and playback arrangement of another embodiment of the invention.
FIGURE 7 is a more detailed block diagram of the sampling circuit of FIGURES 4 and 5.

Referring now to the drawings, there is shown in FIGURE 1 response curve 21 for a particular playback head. Point 22 on this curve represents the fundamental pulse repetition frequency (PRF) of a pulse code modulated (PCM) recorded signal such as is used in the prior art. In the past the PCM recorded signal was chosen to be at that fundamental pulse repetition frequency, since it was essential that the output waveform of the playback head be a derivative of the PCM recorded signal so that the recorded signal could be faithfully reproduced.

In observing FIGURE 1, it can be readily seen that point 23 on response curve 21, and not point 22, represents the fundamental pulse repetition frequency that a PCM recorded signal should have for the playback head to provide maximum energy output, and, accordingly, assure that maximum energy transfer will be maintained from record to playback. Since the fundamental pulse repetition frequency at point 23 is considerably higher than that for point 22, recording at this fundamental pulse repetition frequency would result in the packing density of the magnetic recording tape being greatly improved, i.e., a given length of tape would be capable of storing more information or, saying it in another way, a lesser amount of tape would be capable of storing the same information. When the PCM recorded signal is at this higher value of fundamental pulse repetition frequency (point 23 of response curve 21), the gap width of the playback head is equal to one-half wavelength of the PCM recorded signal at this higher value of the fundamental pulse repetition frequency minus certain playback head losses.

Generally, playback head losses should be considered in determining the gap width of the playback head; but for simplicity of discussion, they will be neglected in the description that follows.

Figure 2:
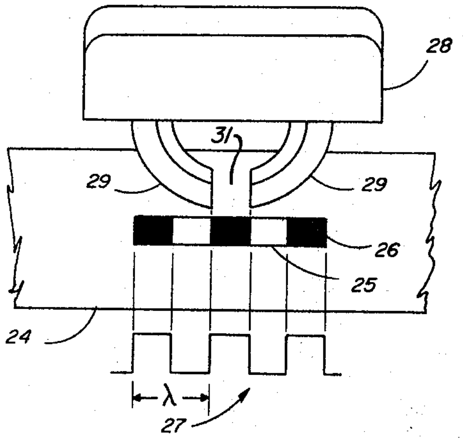
FIGURE 2 is a perspective view of the playback head of the invention showing the relationship of the gap width of the pole pieces of the playback head to the waveform of the signal recorded on the tape.

In FIGURE 2, there is illustrated magnetic recording tape 24 having thereon a magnetic pattern represented by light areas 25 and dark areas 26. A portion 27 of a PCM recorded signal, which induces this magnetic pattern on the tape, is shown below the tape in its proper relationship to the light and dark areas. It can be readily seen that light areas 25 and dark areas 26 portray conditions when a low level signal or voltage and a high level signal or voltage, respectively, is applied to the recording head. The high level voltages of portion 27 are at the fundamental PRF of the PCM recorded signal. The spacing from the beginning of one high level voltage to the beginning of an adjacent high level voltage of portion 27 is one wavelength, and the spacing of each high level voltage and each low level voltage of portion 27, is equal to one-half wavelength. Accordingly, the light and dark areas are each one-half wavelength long.

Playback head 28 is shown comprising pole pieces 29 having gap 31 therebetween of width equal to the length of one dark area or one-half wavelength of fundamental PRF of the PCM recorded signal. By having a gap of this width playback head 28 possesses the characteristics of a low pass filter, and, accordingly provides an output signal which is an integral of the PCM recorded signal.

Figure 3:
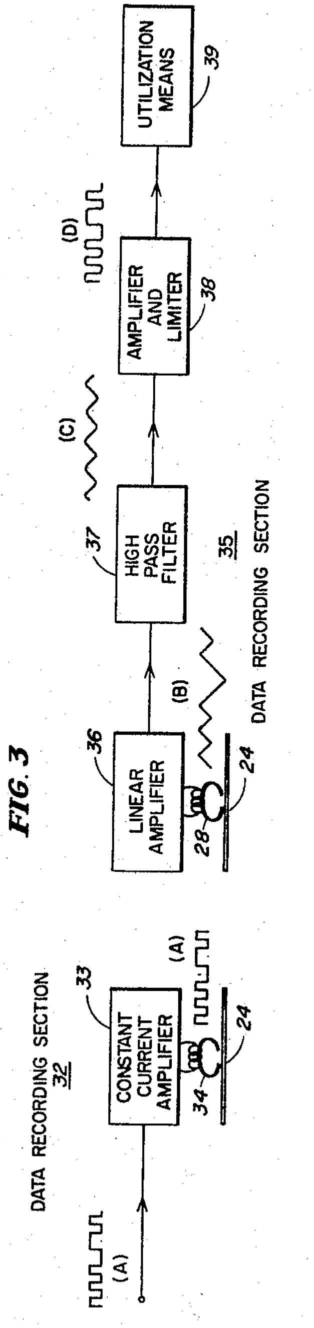
FIGURE 3 is a block diagram showing the recording and playback arrangement of the preferred embodiment of the invention.

The advantages achieved by playback head 28 having a gap width equal to one-half wavelength of the fundamental PRF of the PCM recorded signal are realized in the recording and reproducing system of FIGURE 3. In this system one important requirement is that data recording section 32 does not degrade the square wave characteristics of the PCM data when it is applied to magnetic tape 24. To accomplish this, data recording section 32 comprises constant current amplifier 33 (one essentially insensitive to frequency variations) connected to recording head 34.

Figure 6:
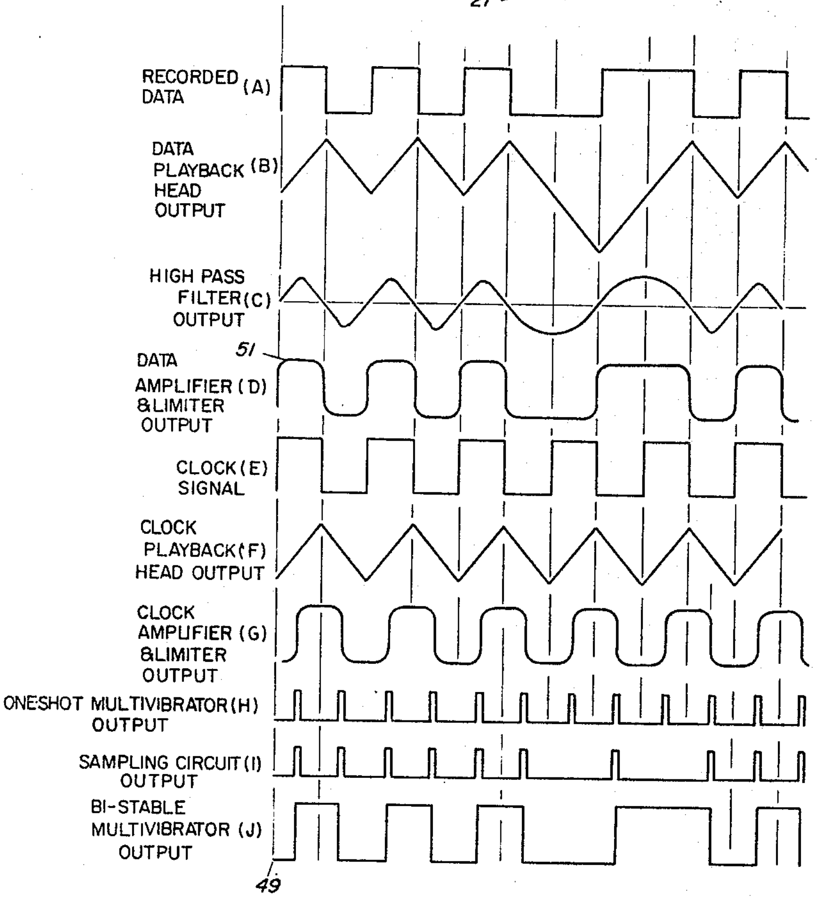
FIGURE 6 illustrates the waveforms that are derived from circuits of the block diagrams of FIGURES 3, 4, and 5 in time relationship.

A PCM data signal of the type shown as waveform A in FIGURE 6, wherein a "crossover" exists whenever the waveform changes its direction, either positively or negatively, is applied to constant current amplifier 33. The output signal from this amplifier is coupled to recording head 34, which, in turn, induces a magnetic pattern on a recording storage medium such as magnetic recording tape 24.

The data stored on magnetic tape 24 is reproduced as an electrical signal, substantially identical to that recorded, by data reproducing section 35. Pick-up means, such as playback head 28, views the magnetic pattern on tape 24 and converts it into an electrical signal, or, to be more exact, the magnetic pattern on tape 24 induces a voltage in playback head 28. As already mentioned above, playback head 28 has a gap width equal to one-half wavelength of the fundamental PRF of recorded PCM data signal (waveform A of FIGURE 6) and acts as a low pass filter or integrator. Accordingly, the output signal from playback head 28 is a trapezoidal waveform (waveform B of FIGURE 6) wherein the peaks thereof correspond to the "crossovers" of the recorded PCM signal. While waveform B is different from waveform A, it still contains the same information.

To reconstruct the PCM recorded signal, the output signal from playback head 28, after being first amplified by linear amplifier stage 36, is passed via high pass filter 37 to amplifier and limiter 38. High pass filter 37 has a low frequency cut-off point at a frequency value substantially equal to the recorded signal's fundamental pulse repetition frequency. The output signal from this high pass filter, depicted as waveform C of FIGURE 6, is a derivative of the signal applied thereto from playback head 28 and contains all of the original information.

This filter output signal is applied to amplifier and limiter 38 where it is amplified and limited or clipped and wherefrom a signal (waveform D of FIGURE 6) is derived which is substantially the same wave shape as the PCM recorded data signal (waveform A of FIGURE 6). In most instances this completes the restoration process, and the output signal from amplifier and limiter 38 is then applied to utilization means 39 such as an oscilloscope, computer, or printer.

However, where maximum precision is essential, additional circuitry must be used with the basic recording and reproducing system of FIGURE 3. This is due to the fact that waveform A of FIGURE 6 is a two frequency signal, i.e., while it is primarily at one PRF, portions thereof are at another PRF. When a signal having a waveform of this type is applied to a filter, because of the inherent characteristic of the filter, the phase of the signal shifts causing a slight asymmetry at the points of the frequency change.

Accordingly, in situations where symmetry or high timing accuracy is required the recording and reproducing system shown in FIGURE 4 can be utilized. This system includes, essentially, the recording and reproducing system of FIGURE 3 modified by the addition of clock recording section 32′ to the data recording section 32 and clock reproducing section 41 to the data reproducing section 35. In addition, a sampling circuit 42 is connected to data reproducing section 34 and clock reproducing section 41 to receive the outputs therefrom and to cooperate therewith to produce a sampled output, and a bistable multivibrator 43 is connected to sampling circuit 42 to receive the output therefrom to reconstruct the original recorded data.

Data recording section 32 of the recording and reproducing systems of FIGURE 4 comprises the same components and operates in the same manner as already described in connection with FIGURE 3. Clock recording section 32′ of this system comprises constant current amplifier 33′ to which is applied a clock signal of the type depicted as waveform E of FIGURE 6. The output signal from this amplifier is coupled to record head 34′ which in turn induces a magnetic pattern on the magnetic tape 24. Accordingly, recording tape 24 can be considered as carrying two tracks of information—a data track and clock track.

Upon playback, the magnetic pattern on the data track and clock track on tape 24 induce voltages in data playback head 28 and clock playback head 28′, respectively. Data reproduction section 35 comprises the same components and operates in the same manner as already described in connection with FIGURE 3.

The output signal from clock playback head 28′, shown as waveform F of FIGURE 6, is an integral of the clock recorded signal. It is applied to amplifier and limiter 44 where it is both amplified and either limited or clipped to form a signal having a waveform such as waveform G of FIGURE 6. This signal is coupled to one-shot multivibrator 45, which in turn, generates unidirectional pulses, shown as waveform H in FIGURE 6, one pulse being produced for each crossover of waveform G regardless of the polarity thereof. These pulses, shifted 90 degrees with respect to the output signal (waveform D of FIGURE 6) from amplifier and limiter 38, are applied with the signal from amplifier and limiter 38 to sampling circuit 42.

In sampling circuit 42, the pulses from one-shot multivibrator 45 act to sample waveform D of FIGURE 6 twice per wavelength and produce pulses (waveform I of FIGURE 6, for example) in a manner that will be described in more detail in connection with FIGURE 7. These pulses are applied to bistable multivibrator 43, which in turn, generates a signal (waveform J of FIGURE 6) which is substantially an exact duplicate of data waveform A of FIGURE 6, only shifted approximately 90 degrees. Bistable multivibrator 43 can be reset to an initial state by control of its reset input 48.

One form of sampling circuit 42 is shown in FIGURE 7. It comprises an Exclusive OR gate 46 to which is connected the output from bistable multivibrator 43 and the output (waveform D of FIGURE 6) from amplifier and limiter 38 of the data reproducing section 35; and an AND gate 47 to which is connected the output from Exclusive OR gate 46 and the output (waveform A of FIGURE 6) from one-shot multivibrator 45. The output (waveform I of FIGURE 6) from AND gate 47 is applied to bistable multivibrator 43.

As used herein, an Exclusive OR gate has a positive output voltage whenever one input signal applied thereto is a low level voltage at the same time that the other input signal is a high level voltage. On the other hand, if both of the inputs are, simultaneously, high level voltages, or, simultaneously, low level voltages, the Exclusive OR gate provides no output. In looking at waveforms A, D, E, G, or J of FIGURE 6, high level is considered to be the most positive portions of the waveforms while low level is considered to be the most negative portions of the waveforms.

Initially, bistable multivibrator 43 is reset in its "off" condition of low level voltage output by reset 48. Low level voltage 49 of waveform J of FIGURE 6 illustrates the voltage output of bistable multivibrator 43 under this condition. This low level voltage is applied to Exclusive OR gate 46. At this same time, high level voltage 51 of waveform D of FIGURE 6 is supplied from amplifier and limiter 38 to Exclusive OR gate 46. Since, simultaneously, Exclusive OR gate 46 has applied thereto a high level and a low level voltage, a positive output voltage is derived from it and applied to AND gate 47.

As soon as a positive pulse is applied from one-shot multivibrator 45 to AND gate 47, since there has already been a positive voltage applied thereto from Exclusive OR gate 46, there is a pulse at the output thereof. This pulse triggers bistable multivibrator 43 into its "on" condition of high level voltage. When this happens, the inputs applied to Exclusive OR gate 46 becomes substantially the same voltage level and there is no output therefrom. Accordingly, there is no output from AND gate 47, and bistable multivibrator 43 stays in its "on" condition of high level voltage.

Now when the output (waveform D of FIGURE 6) from amplifier and limiter 38 is again at its low level voltage, there is again two different levels of voltage applied to Exclusive OR gate 46. Accordingly, a positive signal is again applied from Exclusive OR gate 46 to AND gate 47. Then, as soon as another pulse is applied from one-shot multivibrator 45 to AND gate 47, there is another pulse output applied therefrom to bistable multivibrator 43 to change it from "on" to "off" condition.

It can readily be seen that as long as Exclusive OR gate 46, AND gate 47, bistable multivibrator 43, one-shot multivibrator 45 and amplifier-limiter 38 continue to operate in the manner described above, the output signal (waveform J of FIGURE 6) from bistable multivibrator 43 is substantially an exact duplicate of data waveform A of FIGURE 6, but shifted approximately 90 degrees.

Should it become desirable to record and reproduce more than one data track, then the recording and reproducing system of FIGURE 4 could be modified by the addition of data recording sections and data reproducing sections equal in number to the number of additional data tracks to be accommodated.

Figure 5:
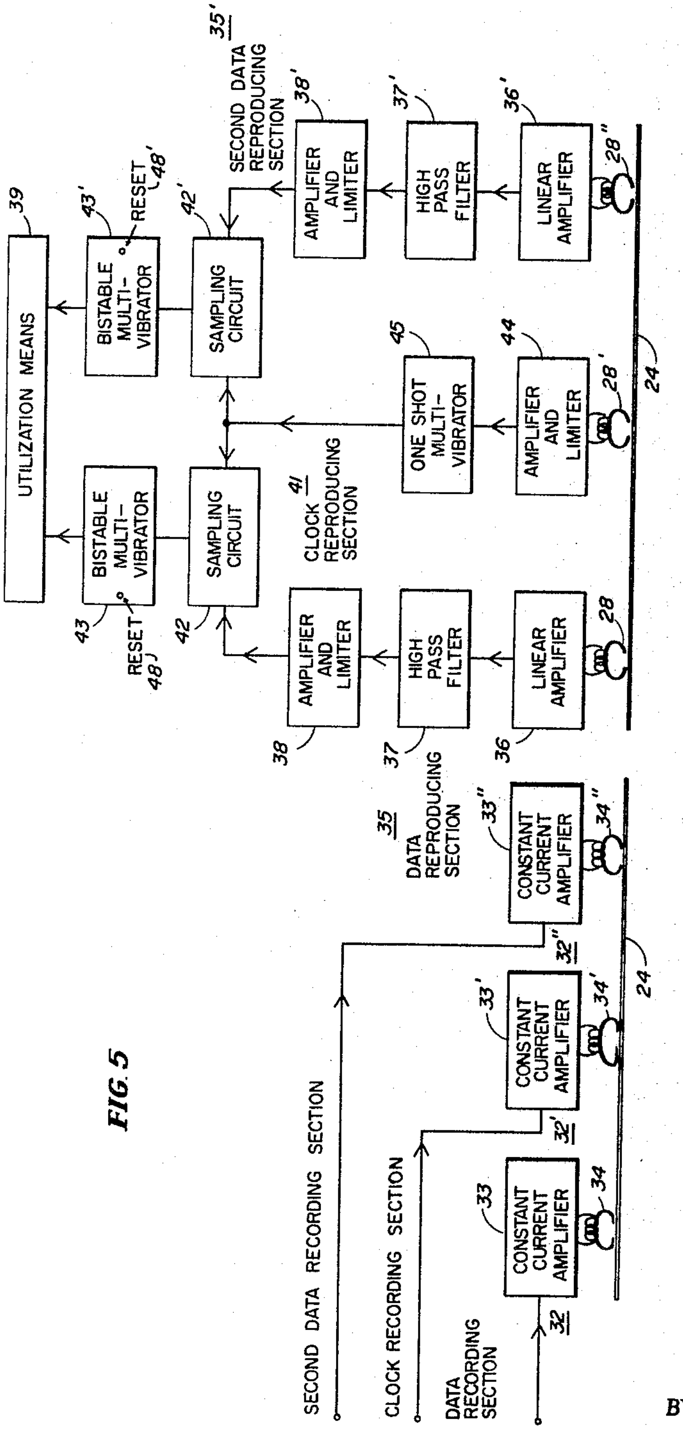
FIGURE 5 is a block diagram of another embodiment of the instant invention adapted for use in a PCM data recording and reproducing system using multiple recording tracks.

An example of such a system is illustrated in FIGURE 5 wherein two data tracks are recorded and reproduced. It includes data record section 32, clock recording 32', data reproducing section 35, and clock reproducing section 41 (which sections have already been described above) and, additionally, second data recording section 32'' and second data reproducing section 35'.

Second data recording section 32'', comprising constant current amplifier 33'' and recording head 34'', functions in the same manner as data recording section 32 to induce a magnetic pattern on magnetic tape 24 in accordance with the information applied to constant current amplifier 33''. Second data reproducing section, including playback head 28'', linear amplifier 36', high pass filter 37', and amplifier and limiter 38', operates in the same manner as data reproducing section 35 to develop a signal at the output of amplifier and limiter 38' having a waveshape in the form of waveform D of FIGURE 6 but corresponding to the PCM recorded data signal picked up by playback head 28'' from magnetic tape 24.

Sampling circuit 42' is connected to one-shot multivibrator 45 and to amplifier and limiter 38' and operates in the same manner as already mentioned above in connection with sampling circuit 42. It can be readily seen that clock reproducing section 41 has its output from one-shot multivibrator 45 applied to both sampling circuits 42 and 42'. If other data reproducing sections, other than sections 35 and 35', should be used, then a separate sampling circuit would have to be provided for each additional data reproducing section, and the output clock pulses would have to be applied to all the sampling circuits.

Bistable multivibrator 43', having a reset 48', is connected to sampling circuit 42' and functions in the same manner as already described above in connection with bistable multivibrator 43. Should it be desired to reproduce more than two data signals, then a bistable multivibrator would have to be associated with each sampling circuit. Each bistable multivibrator provides an output signal substantially a duplicate of the PCM recorded signal that is applied to the track with which it is associated. Utilization means 39 is connected to receive the output from each of the bistable multivibrators.

While the invention is described with the recording and playback heads being separate elements, it should be understood that a single head, constructed in the manner as described for the playback head, can be used to perform both functions. Also, should it become desirable to compensate for any phase shift that may result in the system, a phase shifting network can be inserted between one-shot multivibrator 45 and each sampling circuit.

The foregoing disclosure relates to a preferred embodiment of the invention. Numerous modifications or alterations may be made therein without department from the spirit and scope of the invention set forth in the appended claims.

What is claimed is:

1. In a system for recording pulse code modulated data on magnetic tape and for reproducing said data stored on said tape:
   - a playback head having a gap width substantially equal to one-half wavelength of said recorded pulse code modulated data signal for converting said recorded pulse code modulated data into an electrical signal which is an integral of said recorded pulse code modulated data;
   - a linear amplifying means connected to said playback head;
   - a high pass filter connected to said linear amplifying means for differentiating the output therefrom;
   - an amplifying means connected to said high pass filter; and
   - a clipping circuit connected to said amplifying means.

2. A system for reproducing pulse code modulated data that has been stored on magnetic tape comprising:
   - a playback head having a gap width substantially equal to one-half wavelength of the fundamental pulse repetition frequency of said recorded pulse code modulated data signal minus playback head losses for converting said recorded pulse code modulated data into an electrical signal which is an integral of said recorded pulse code modulated data;
   - a linear amplifying means connected to said playback head to amplify the output therefrom;
   - a high pass filter connected to said linear amplifying means to differentiate the output therefrom;

an amplifying stage connected to said high pass filter to increase the amplitude of signal output thereof;

a clipping circuit connected to said amplifying stage to develop a signal substantially a reproduction of said recorded pulse code modulated signal; and a utilization means connected to said clipping circuit to display the output therefrom.

3. In a system for recording both pulse code modulated data and clock pulses on a recording medium and for reproducing said pulse code modulated data stored on said recording medium:

a first pick-up means for converting said stored pulse code modulated data into an electrical signal which is an integral or said recorded pulse code modulated data;

filter means coupled to said first pick-up means for differentiating the output signal thereof;

a first shaping means connected to said filter means for forming a signal substantially the shape of said recorded pulse code modulated data;

a second pick-up means for converting said clock pulses stored on said recording medium into an electrical signal which is an integral of said recorded clock pulses;

a second shaping means connected to said second pick-up means for amplifying and squaring the output therefrom;

a pulse producing means connected to said second shaping means for producing a narrow pulse for each pulse applied thereto; and a sampling and generating means connected to said first shaping means and to said pulse producing means for receiving the outputs therefrom and for producing an output which is a reproduction of said pulse code modulated data.

4. In a system for recording both pulse code modulated data and clock pulses on a recording medium and for reproducing said data stored on said recording medium:

first and second playback heads each having a gap width substantially equal to one-half wavelength of the fundamental pulse repetition frequency of said pulse code modulated data for converting said recorded pulse code modulated data into an electrical signal which is an integral of said recorded pulse code modulated data, said first playback head and said second playback head to pickup said pulse code modulated data and said clock pulses, respectively, from said recording medium;

linear amplifying means connected to said first playback head for amplifying the output therefrom;

a high pass filter connected to said linear amplifying means for differentiating the output signal therefrom;

a first amplifying-limiting means connected to said high pass filter;

a second amplifying-limiting means connected to said second playback head, each of said amplifying-limiting means amplifying and squaring the signals applied thereto;

pulse producing means connected to said second amplifying-limiting means for producing a narrow pulse output for every pulse applied thereto;

a sampling and generating means connected to said first amplifying-limiting means and to said pulse producing means for producing an output which is a reproduction of said pulse code modulated data.

5. A system for reproducing pulse code modulated data that has been stored on a first track on magnetic tape, wherein clock pulse data has been stored on a second track on said magnetic tape, comprising:

first and second playback heads each having a gap width substantially equal to one-half wavelength of the fundamental pulse repetition frequency of said recorded pulse code modulated data minus playback head losses for converting said recorded pulse code modulated data into an electrical signal which is an integral of said recorded pulse code modulated data, said first and second playback heads being associated with first and second tracks, respectively;

linear amplifying means connected to said first playback head for amplifying its output;

a high pass filter connected to said linear amplifying means for differentiating the output signal therefrom;

a first amplifying-limiting means connected to said high pass filter;

a second amplifying-limiting means connected to said second playback head, each of said amplifying-limiting means amplifying and shaping the signals applied thereto;

pulse forming means connected to said second amplifying-limiting means for developing narrow pulses;

a sampling and generating means connected to said first amplifying-limiting means and to said pulse forming means for generating an output signal which is reproduction of said pulse code modulated data; and a utilization means for using said pulse code modulated data.

6. In a system for recording a plurality of tracks of pulse code modulated data on a recording medium and for reproducing the data stored thereon in each of said plurality of tracks:

pick-up means, equal in number to the number of data tracks, for converting the stored pulse code modulated data from the particular track with which each is associated into electrical signals which are an integral of the recorded pulse code modulated data;

filter means, equal in number to the number of pick-up means, for obtaining output signals which are derivatives of the input signals applied to them, each of said filter means being coupled to the pick-up means with which it cooperates; and shaping means equal in number to the number of filter means, each of said shaping means coupled to the filter means with which it is associated for forming an output signal which is substantially identical to the pulse code modulated data recorded on the track with which it is associated.

7. In the system of claim 6 wherein a clock track of clock pulse data is provided on the recording medium in addition to said plurality of data tracks:

a separate pick-up means for converting the stored clock data into an electrical signal which is an integral of the recorded clock data;

forming means connected to said separate pick-up means for reconstructing a waveform substantially the shape of said recorded clock data;

pulse producing means connected to said forming means for developing a short duration pulse for each longer duration reconstructed clock pulse;

sampling and generating means equal in number to the number of shaping means, each sampling and generating means having applied thereto the output signal from the shaping means with which it is associated and the output signal from said pulse producing means and providing an output signal a replica of the pulse code modulated data recorded on the track with which it is associated.

8. A system for reproducing a plurality of tracks of recorded pulse code modulated data that has been stored on a magnetic tape, wherein clock pulse data has been stored on a separate track on said magnetic tape, comprising:

playback heads equal in number to the number of tracks of pulse code modulated data, each of said playback heads have a gap width equal to one-half wavelength of the fundamental frequency of the recorded pulse code modulated data with which it is associated;

filter means equal in number to the number of pulse code modulated data tracks, each of said filter means being coupled to the playback head means with which it cooperates for obtaining an output signal which is a derivative of the input signal coupled to it;

amplifying-limiting means equal in number to the number of filter means, each of said amplifying-limiting means being coupled to the filter means with which it is associated for forming an output signal which is substantially identical to the pulse code modulated data recorded on the track with which it is associated;

a separate playback head associated with said clock pulse data track having a gap width equal to one-half wavelength of the pulse repetition frequency of the clock pulses;

amplifying-clipping means connected to said separate playback head for reconstructing a waveform substantially the shape of said recorded clock data;

pulse producing means connected to said amplifying-clipping means for developing a short duration pulse for each longer duration reconstructed clock pulse;

sampling and generating means equal in number to the number of amplifying-limiting means, each of said sampling and generating means being coupled to the amplifying-limiting means with which it is associated and to said pulse producing means and providing an output signal a replica of the pulse code modulated data recorded on the track with which it is associated; and a utilization means connected to receive the output signal from each of said sampling and generating means for indicating a display of the reproduced data.

References Cited

UNITED STATES PATENTS

| | | | |
|---|---|---|---|
| 3,076,183 | 1/1963 | Willoughby | 340—174.1 |
| 3,217,329 | 11/1965 | Gabor | 340—174.1 |

OTHER REFERENCES

Pages 60–66, 1957, Burstein, H. and Pollak, H., Elements of Tape Recorder Circuits, Gernsback Library, Inc., New York, N.Y.

BERNARD KONICK, *Primary Examiner.*

A. I. NEUSTADT, *Assistant Examiner.*